No. 710,403. Patented Oct. 7, 1902.
W. O. BAKER.
HAY LOADER.
(Application filed Apr. 21, 1902.)
(No Model.)
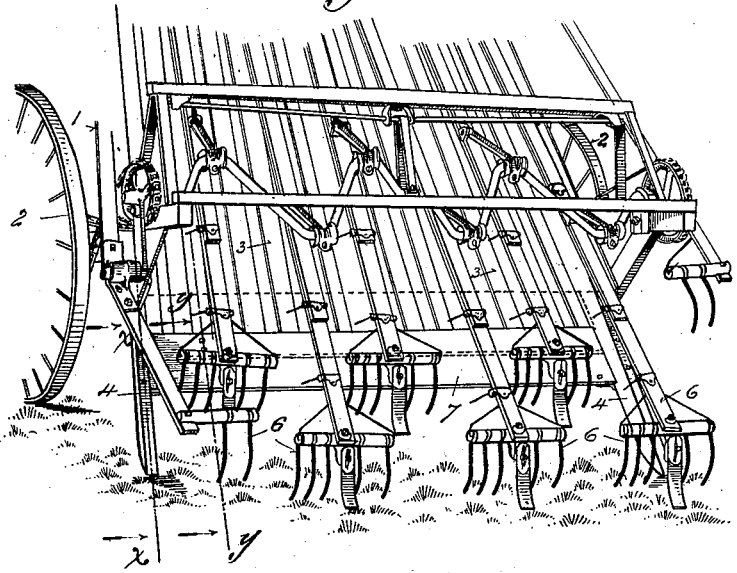
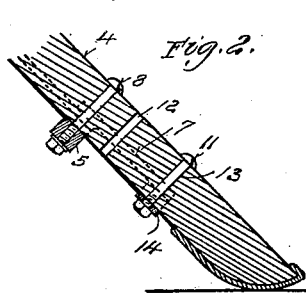
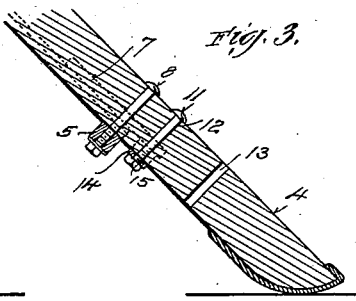
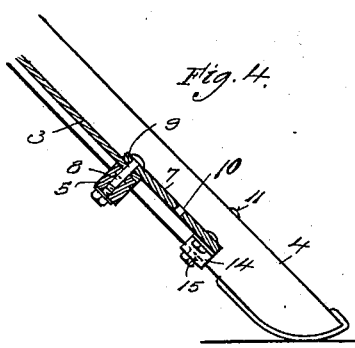
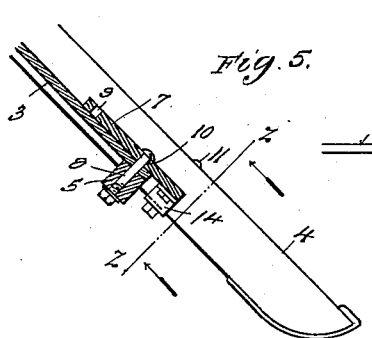
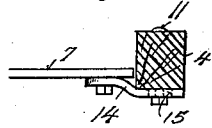
WITNESSES:
J. A. Dawley
Will O'Laughlin
INVENTOR,
William O. Baker
BY
H. A. Toulmin
ATTORNEY.

UNITED STATES PATENT OFFICE.

WILLIAM O. BAKER, OF SPRINGFIELD, OHIO, ASSIGNOR TO THE THOMAS MANUFACTURING COMPANY, OF SPRINGFIELD, OHIO, A CORPORATION OF OHIO.

HAY-LOADER.

SPECIFICATION forming part of Letters Patent No. 710,403, dated October 7, 1902.

Application filed April 21, 1902. Serial No. 103,868. (No model.)

*To all whom it may concern:*

Be it known that I, WILLIAM O. BAKER, a citizen of the United States, residing at Springfield, in the county of Clark and State of Ohio, have invented certain new and useful Improvements in Hay-Loaders, of which the following is a specification, reference being had therein to the accompanying drawings.

This invention relates to hay-loaders, and has for its object to provide a construction whereby machines of this character may be employed to rake and lift the hay either from the swath or from the windrow with equal efficiency in either case.

To these ends my invention consists in certain novel features, which I will now proceed to describe and will then particularly point out in the claims.

In the accompanying drawings, Figure 1 is a perspective view of a portion of a hay-loader embodying my invention. Fig. 2 is a detail sectional view of the same, on an enlarged scale, taken on the line $x\ x$ of Fig. 1 and looking in the direction of the arrows, the parts being shown adjusted in position for raking from the swath. Fig. 3 is a view similar to Fig. 2, but showing the parts adjusted in position for raking from the windrow. Fig. 4 is a detail sectional view taken on the line $y\ y$ of Fig. 1 and looking in the direction of the arrows, the parts being shown in the position illustrated in Fig. 2. Fig. 5 is a view similar to Fig. 4, the parts being shown, however, in the position illustrated in Fig. 3; and Fig. 6 is a detail sectional view taken on the line $z\ z$ of Fig. 5 and looking in the direction of the arrows.

In the said drawings, 1 indicates, as a whole, a hay-loader of any approved construction supported on wheels 2 and having the usual inclined deck 3 with side beams or sills 4 and transverse supporting-bars 5, connecting the side beams and supporting the deck. The usual rakes are illustrated at 6 and are constructed and operated in any approved manner. In hay-loaders of this type as usually constructed the deck terminates at the lower cross-bar 5 and the lower line of the deck is fixed, so far as its height from the ground is concerned, so that if it is low enough to adapt the machine to properly rake from the swath it is too low to permit successful raking when the hay is piled high in windrows. In order to overcome this objection, I provide a deck the lower edge of which is of sufficient height above the ground to permit raking from the windrow, and in order to adapt the apparatus to also rake from the swath I provide an adjustable extension 7, which is movable in the direction of the plane of the deck toward and from the ground, so as to vary the height of the lower edge of the deck from the ground, considering the extension as forming part of the deck. Any suitable provision for securing the extension in place after adjustment may be employed; but I prefer the construction which I have shown for this purpose. In this case the lower cross-bar 5 is provided with apertures, through which pass removable bolts 8, and the extension 7 is provided in connection with each bolt 8 with two or more apertures, two being indicated in the present instance at 9 and 10. Similarly, each side piece 4 is provided with a removable bolt 11 and with apertures 12 and 13 to receive the same, while the extension 7 is provided with a bracket 14, having an aperture 15, through which the bolt 11 may pass. It will be seen that when the parts are in the position shown in full lines in Fig. 1 and also in Figs. 2 and 4 the bolts 8 pass through the upper apertures 9 of the extension, while the bolts 11 pass through the lower apertures 13 of the side pieces, the extension being in its lowermost position, with the parts organized for raking from the swath. When the parts are in the position shown in dotted lines in Fig. 1 and also shown in Figs. 3 and 5, the bolts 8 pass through the lower apertures 10 of the extension, while the bolts 11 pass through the upper apertures 12 of the side pieces, the extension being raised and the parts being in position for raking from the windrow. As a rule the side pieces approach each other toward the top, and to accommodate this narrowing of the space between them the brackets 14 are slotted at one end, preferably the end through which the bolt 11 passes, the aperture 15 being elongated, as indicated in dotted lines in Fig. 6.

It is obvious that other adjusting means than the bolts and apertures may be employed and that any desired number of bolts and apertures may be used. It is also obvious that various other modifications may be made without departing from the principle of my invention, and I therefore do not wish to be understood as limiting myself strictly to the precise details hereinbefore described, and shown in the accompanying drawings.

Having thus fully described my invention, what I claim as new, and desire to secure by Letters Patent, is—

1. A hay-loader having an inclined deck and coöperating reciprocating rakes, said deck having an elevated lower end, in combination with an extension of said deck located at the lower end thereof and adjustable toward and from the ground, substantially as described.

2. A hay-loader having an inclined deck and coöperating reciprocating rakes, said deck having an elevated lower end, in combination with an extension of said deck located at the lower end thereof and adjustable in the plane of the deck toward and from the ground, substantially as described.

3. A hay-loader of the character described having side pieces, cross-bars, and a deck terminating at the lower cross-bar, an extension-piece provided with a plurality of adjusting-apertures, the side pieces being provided with a corresponding plurality of adjusting-apertures, and removable adjusting-bolts, one set passing through the cross-bar and through the apertures of the extension-piece, and the other set passing through the adjusting-apertures of the side pieces, the extension-piece being provided with apertured brackets to receive these last-mentioned bolts, substantially as described.

4. A hay-loader of the character described having converging side pieces, cross-bars, and a deck terminating at the lower cross-bar, an extension-piece provided with a plurality of adjusting-apertures, the side pieces being provided with a corresponding plurality of adjusting-apertures, and removable adjusting-bolts, one set passing through the cross-bar and through the apertures of the extension-piece, and the other set passing through the adjusting-apertures of the side pieces, the extension-piece being provided with slotted brackets to receive these last-mentioned bolts, substantially as described.

In testimony whereof I affix my signature in presence of two witnesses.

WILLIAM O. BAKER.

Witnesses:
 E. O. HAGAN,
 IRVINE MILLER.